(12) United States Patent
Wu et al.

(10) Patent No.: US 11,601,015 B2
(45) Date of Patent: Mar. 7, 2023

(54) WIRELESS CHARGER

(71) Applicant: CYNTEC CO., LTD., Hsinchu (TW)

(72) Inventors: Tsung-Chan Wu, Hsinchu County (TW); Kuan Yu Chiu, Miaoli County (TW); Chien-Hui Chen, Taoyuan (TW); Yen-Ming Liu, Changhua County (TW)

(73) Assignee: CYNTEC CO., LTD., Hsinchu (TW)

( * ) Notice: Subject to any disclaimer, the term of this patent is extended or adjusted under 35 U.S.C. 154(b) by 0 days.

(21) Appl. No.: 17/583,184

(22) Filed: Jan. 24, 2022

(65) Prior Publication Data

US 2022/0239152 A1    Jul. 28, 2022

Related U.S. Application Data

(60) Provisional application No. 63/142,508, filed on Jan. 28, 2021.

(51) Int. Cl.
*H02J 50/00* (2016.01)
*H02J 50/40* (2016.01)
*H02J 50/10* (2016.01)

(52) U.S. Cl.
CPC ............. *H02J 50/005* (2020.01); *H02J 50/10* (2016.02); *H02J 50/402* (2020.01)

(58) Field of Classification Search
CPC .............................. H02J 50/005; H02J 50/10
USPC .......................................................... 307/104
See application file for complete search history.

(56) References Cited

U.S. PATENT DOCUMENTS

| | | | | |
|---|---|---|---|---|
| 2015/0338283 | A1* | 11/2015 | Chien | H02J 7/0047 320/108 |
| 2018/0078087 | A1* | 3/2018 | Benitez | H05B 6/1236 |
| 2020/0044482 | A1* | 2/2020 | Partovi | H02J 50/80 |
| 2020/0411911 | A1* | 12/2020 | Wang | H02J 7/0042 |

\* cited by examiner

*Primary Examiner* — Alfonso Perez Borroto
(74) *Attorney, Agent, or Firm* — Min-Lee Teng

(57) ABSTRACT

A wireless charger, comprising: a thermal-conductive plastic cover; a first circuit board; and a metallic case, wherein the first circuit board are disposed in the metallic case, wherein a wind tunnel is formed between the thermal-conductive plastic cover and the circuit board for lowering the temperature of an electronic device that is wirelessly charged on the thermal-conductive plastic cover.

20 Claims, 5 Drawing Sheets

| Condition | Peak load (N) | Break load (N) | Tot Ext at Break (mm) | Pk Ext at Pk Load (N) | Total Ext at Pk load (N) | Compression (%) |
|---|---|---|---|---|---|---|
| Gap 1mm | 0.71 | 236.67 | 314.09 | 8.01 | 4.75 | 12.76 | 68.10 |
| Gap 2mm | 0.67 | 205.85 | 295.78 | 8.15 | 4.51 | 12.67 | 68.33 |
| Gap 3mm | 0.62 | 176.51 | 282.23 | 9.00 | 4.34 | 13.34 | 66.65 |

FIG. 2

| Location | Temperature Results @25°C (°C) | | ΔT (°C) |
|---|---|---|---|
| | Natural | Forced | |
| Smartphone | 69.74 | 38.95 | 30.79 |
| Tx Surface (Mat) | 67.26 | 38.11 | 29.15 |
| NFC Board | 66.77 | 38.87 | 27.90 |
| Coil | 66.46 | 40.22 | 26.24 |
| Ferrite | 66.36 | 40.15 | 26.21 |
| Aluminum Case | 66.21 | 40.00 | 26.21 |
| Driver Board | 93.58 | 68.54 | 25.04 |
| Aluminum Cover | 68.70 | 43.64 | 25.06 |

FIG. 3

WIRELESS CHARGER

CROSS-REFERENCE TO RELATED APPLICATIONS

This application claims the benefit of U.S. Provisional Application Ser. No. 63/142,508 filed on Jan. 28, 2021, wherein the entirety of the Provisional Application is incorporated by reference herein.

BACKGROUND OF THE INVENTION

Field of the Invention

The invention relates to a wireless charger for charging an electronic device.

Description of the Related Art

As charging for consumer and automotive devices become more and more popular, however, when the temperature of a mobile phone being wirelessly charged reaches a particular temperature, the mobile phone will stop the high-wattage fast charge mode and start to drop the load to keep the mobile phone's temperature under the particular temperature, which will increase the time to fully charge the mobile phone.

Accordingly, the present invention proposes a better solution to overcome the above-mentioned problems.

SUMMARY OF THE INVENTION

One objective of the present invention is to provide a wireless charger for charging an electronic device, wherein a wind tunnel is formed between a thermal-conductive plastic cover and a circuit board for keeping the temperature of the electronic device not greater than 40° C. to extend the full power charging period.

One objective of the present invention is to provide a structural design of a wireless charging module with a wind tunnel, which can effectively dissipate heat generated by a mobile phone being wirelessly charged and the module to achieve a longer period in high-wattage charging mode.

In one embodiment, a wireless charger is disclosed, wherein the wireless charger comprising: a thermal-conductive plastic cover, comprising an insulating and heat-conducting material; at least one coil; a first circuit board; a metallic case, wherein the at least one coil and the first circuit board are disposed in the metallic case, wherein the first circuit board is disposed between the thermal-conductive plastic cover and the at least one coil, wherein a wind tunnel is formed between the thermal-conductive plastic cover and the circuit board for lowering the temperature of an electronic device when the electronic device is disposed on the thermal-conductive plastic cover for wireless charging the electronic device.

In one embodiment, the wind tunnel is formed between the thermal-conductive plastic cover and the circuit board for keeping the temperature of the electronic device not greater than 40° C.

In one embodiment, a first recess is formed in a top surface of the metallic case, wherein the at least one coil is disposed in the first recess.

In one embodiment, a first recess is formed in a top surface of the metallic case, wherein the at least one coil and the circuit board are disposed in the first recess.

In one embodiment, the at least one coil comprises a plurality of coils disposed in the first recess, wherein the plurality of coils are stacked into a plurality of layers for charging the electronic device.

In one embodiment, the thermal-conductive plastic cover comprises a plurality of protruding bumps for increasing the total area for dissipating heat.

In one embodiment, the protruding bump has a shape of a ball.

In one embodiment, further comprising a fan, wherein the fan is located on a lateral side of the first circuit board under the thermal-conductive plastic cover.

In one embodiment, the thermal-conductive plastic cover comprises a hole to allow air to flow into the wind tunnel.

In one embodiment, the thermal-conductive plastic cover comprises an opening groove to allow air to flow into the wind tunnel.

In one embodiment, a magnetic sheet is disposed under the at least one coil, wherein the at least one coil and the magnetic sheet are tightly bonded to the metallic case.

In one embodiment, the at least one coil is encapsulated by a magnetic material, wherein the at least one coil and the magnetic material are tightly bonded to the metallic case.

In one embodiment, each of the at least one coil is made of an enameled wire.

In one embodiment, each of the at least one coil is made of a wire containing a self-adhesive layer.

In one embodiment, the magnetic sheet comprises at least one of the following: MnZn or NiZn, ferrite, and nanocrystalline.

In one embodiment, the magnetic sheet is made by sintering or ceramic injection molding methods.

In one embodiment, the metallic case comprises metal and plastic.

In one embodiment, the metallic case is made by stamping sheet metal, die-casting, or injection molding.

In one embodiment, the first circuit board comprises a PCB board, wherein at least one of the following is disposed on the PCB board: NFC, NTC, 5G antenna+FAKRA connector, and EMI shielding pattern.

In one embodiment, the thermal-conductive plastic cover comprises high molecular polymers integrated with high thermal conductivity oxide particles such as graphite, alumina, and magnesium oxide.

In one embodiment, the thermal conductivity K of the thermal-conductive plastic cover 101 is in a range of 0.1~6 W/(m·K).

In one embodiment, the metallic case comprises a metallic plate, wherein the first recess is formed at the upper side of the metallic plate of the metallic case, wherein a second recess is formed at the lower side of the metallic plate of the metallic case, wherein a second circuit board is disposed in the second recess of the metallic case.

In one embodiment, the metallic plate comprises Al—Si—Cu alloy.

In one embodiment, the metallic case comprises Al.

In one embodiment, an air deflector is disposed at a bottom surface of the thermal-conductive plastic cover above the fan.

In one embodiment, each electronic device is a mobile phone, TWS, Apple watch, etc.

In one embodiment, the metallic case comprises aluminum or aluminum alloy material.

In one embodiment, the metallic plate comprises ADC12, that is, the metallic plate can have a strong mechanical strength to withstand the stress when the wireless charger is under pressure, wherein the ADC12 comprises Al—Si—Cu alloy.

In one embodiment, a wireless charger, comprising: a thermal-conductive plastic cover, comprising an insulating and heat-conducting material; a first circuit board; and a metallic case, wherein the first circuit board and the metallic case forms a top surface, wherein a wind tunnel is formed between the thermal-conductive plastic cover and said top surface for dissipating heat generated by an electronic device when the electronic device is disposed on the thermal-conductive plastic cover for wireless charging the electronic device.

BRIEF DESCRIPTION OF THE DRAWINGS

The present invention can be more fully understood by reading the subsequent description and examples with references made to the accompanying drawings, wherein:

FIG. 2 is a chart to show different gap sizes of a wind tunnel relative to the charging efficiency when wireless charging an electronic device according to one embodiment of the invention; and FIG. 3 is a chart to compare temperatures of different components when wireless charging an electronic device using the present invention or conventional method.

DETAILED DESCRIPTION OF THE INVENTION

Figures 1A, 1B:
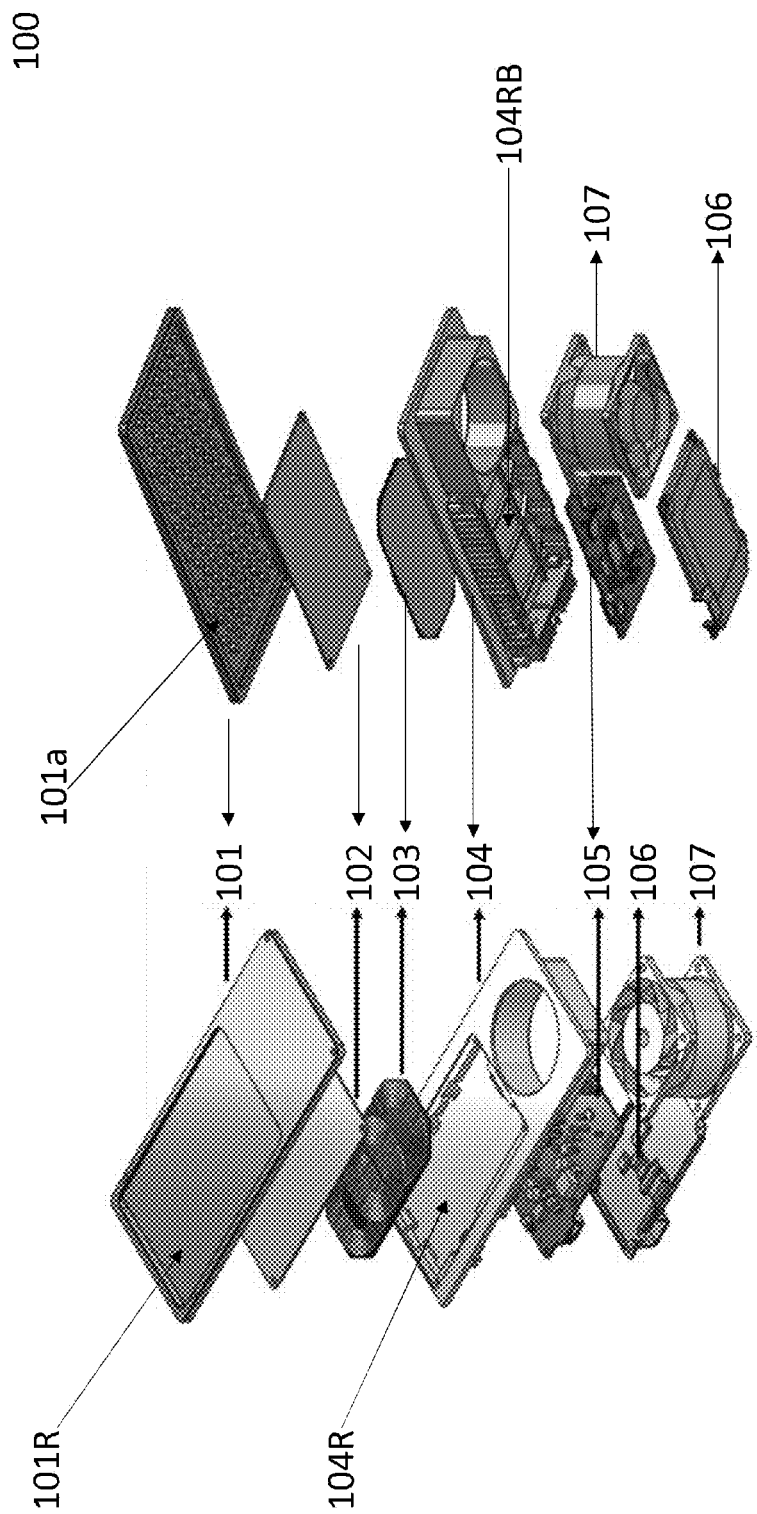
FIG. 1A is an exploded top view of a wireless charger according to one embodiment of the invention.
FIG. 1B is an exploded bottom view of a wireless charger according to one embodiment of the invention.

It is understood that the following disclosure provides many different embodiments, or examples, for implementing different features of the invention. Specific examples of devices and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features are formed between the first and second features such that the first and second features are not in direct contact. In addition, the present disclosure may repeat reference numerals and/or letters in the various examples. This repetition is for simplicity and clarity and does not in itself dictate a relationship between the various embodiments and/or configurations discussed.

The present invention discloses a wireless charger comprising a wind tunnel formed between a thermal-conductive plastic cover and a circuit board for dissipating heat generated by an electronic device disposed on the thermal-conductive plastic cover for wireless charging the electronic device.

The present invention discloses a wireless charger comprising a wind tunnel formed between a thermal-conductive plastic cover and a circuit board for lowering the temperature of an electronic device disposed on the thermal-conductive plastic cover for wireless charging the electronic device.

The present invention discloses a wireless charger comprising a wind tunnel formed between a thermal-conductive plastic cover and a circuit board for lowering the temperature of the electronic device not greater than 40 centigrade degree.

Through the high-level wind tunnel design and suitable fan-forced convection, the temperature of the mobile phone can be maintained below 40° C. when charging at a high wattage of 40 W. Therefore, the power derating will not be triggered and the user experience will be greatly improved. The cooling system is designed to meet the customized high-wattage wireless charging scheme and meet the requirements of low noise.

Figure 1C:
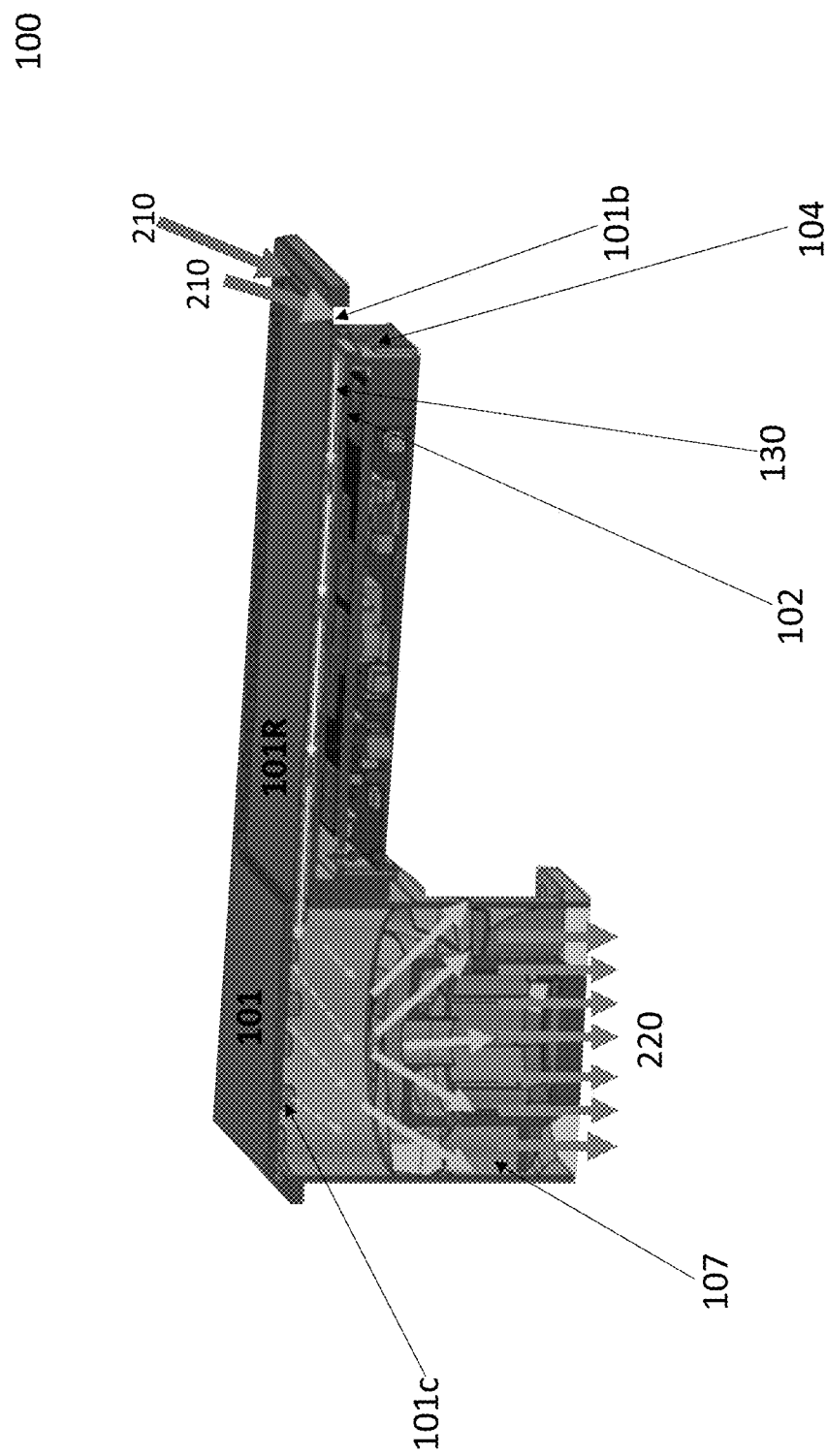
FIG. 1C is a side view of a wireless charger according to one embodiment of the invention.
Figure 1D:
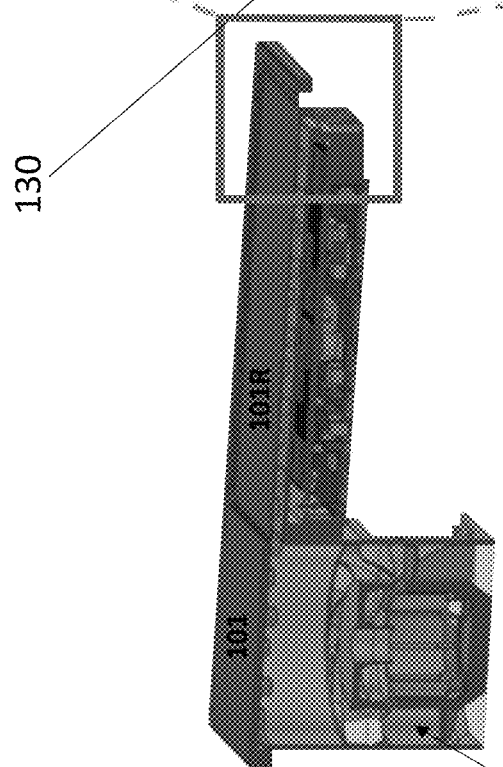
FIG. 1D is a side view of a wireless charger as in FIG. 1C according to one embodiment of the invention.
Figure 1E:
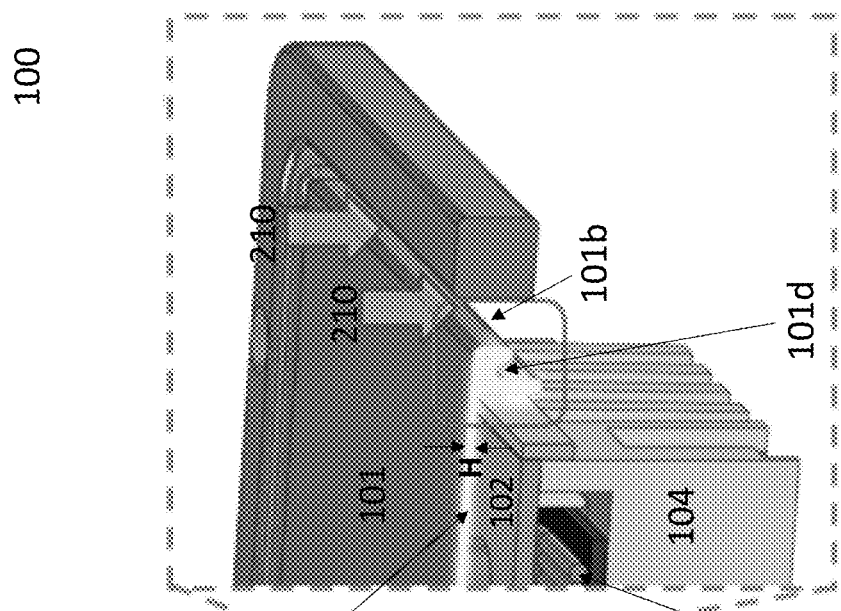
FIG. 1E is an enlarged view of an angle area of the wireless charger FIG. 1C.

FIG. 1A is a top exploded view of a wireless charger 100 according to one embodiment of the invention, FIG. 1B is a bottom exploded view of the wireless charger 100 according to one embodiment of the invention, each of FIG. 1C and FIG. 1D is a side view of the wireless charger 100 according to one embodiment of the invention, and FIG. 1E is an enlarged view of an angle area of the wireless charger 100 in FIG. 1C. Please refer to FIG. 1A-1E, wherein the wireless charger 100 comprises: a thermal-conductive plastic cover 101, comprising an insulating and heat-conducting material; at least one coil 103; a first circuit board 102; a metallic case 104, wherein the at least one coil 103 and the first circuit board 102 are disposed in the metallic case 104, wherein the first circuit board 102 is disposed between the thermal-conductive plastic cover 101 and the at least one coil 103, wherein a wind tunnel 130 is formed between the thermal-conductive plastic cover 101 and the first circuit board 102 for dissipating heat generated by the wireless charger 100 and an electronic device disposed on the thermal-conductive plastic cover 101 for wireless charging the electronic device.

In one embodiment, the wind tunnel 130 is formed between the thermal-conductive plastic cover and the first circuit board 102 for keeping the temperature of the electronic device being wirelessly charged not greater than 40° C. to maintain high-wattage charging for a longer period.

In one embodiment, as shown in FIG. 1E, a stopper 101d is disposed at one end of the wind tunnel 130 to prevent water from entering into the wind tunnel 130.

In one embodiment, as shown in FIG. 1E, a vertical height H of the wind tunnel 130 is between 1 mm to 3 mm.

In one embodiment, as shown in FIG. 1A, a recess 101R is formed in a top surface of the thermal-conductive plastic cover 101, wherein the electronic device being wirelessly charged can be disposed in the recess 101R.

In one embodiment, as shown in FIG. 1A, a first recess 104R is formed in a top surface of the metallic case 104, wherein the at least one coil 103 is disposed in the first recess 104R.

In one embodiment, as shown in FIG. 1A, a first recess 104R is formed in a top surface of the metallic case 104, wherein the at least one coil 103 and the first circuit board 102 are disposed in the first recess 104R.

In one embodiment, the at least one coil 103 comprises a plurality of coils, wherein the plurality of coils are stacked into a plurality of layers for wirelessly charging the electronic device.

In one embodiment, as shown in FIG. 1B, the bottom surface of the thermal-conductive plastic cover 101 comprises a plurality of protruding bumps 101a for increasing the total area for dissipating heat.

In one embodiment, the protruding bump 101a has a ball shape.

In one embodiment, as shown in FIG. 1C, a fan 107 is located on a lateral side of the first circuit board 102 under the thermal-conductive plastic cover 101 to cause the air 210 to flow into the wind tunnel 130.

In one embodiment, as shown in FIG. 1E, the thermal-conductive plastic cover 101 comprises a hole or an opening groove 101b to allow air 210 to flow into the wind tunnel 130.

In one embodiment, as shown in FIG. 1C, a plurality of air reflector 101c is disposed on a bottom surface of the thermal-conductive plastic cover 101 above the fan 107, wherein the allow air 210 flowing into the wind tunnel 130 and being reflected to the outside of the wireless charger 100 through the location 220. By doing so, an electronic device such as a mobile phone can be in high-wattage charging mode by utilizing heat conduction and heat convection.

In one embodiment, a magnetic sheet is disposed under the at least one coil 103, wherein the at least one coil 103 and the magnetic sheet are tightly bonded to the metallic case 104.

In one embodiment, each of the at least one coil 103 is made of an enameled wire.

In one embodiment, each of the at least one coil 103 is made of a wire containing a self-adhesive layer.

In one embodiment, the magnetic sheet comprises at least one of the following:

MnZn or NiZn, ferrite, and nanocrystalline.

In one embodiment, the magnetic sheet is made by sintering or ceramic injection molding methods.

In one embodiment, the metallic case 104 comprises metal.

In one embodiment, the metallic case 104 comprises plastic.

In one embodiment, the metallic case 104 is made by stamping sheet metal, die-casting, or injection molding.

In one embodiment, the first circuit board 102 comprises a PCB board, wherein at least one of the following is disposed on the PCB board: NFC, NTC, 5G antenna+FAKRA connector, and EMI shielding pattern.

In one embodiment, the thermal-conductive plastic cover 101 comprises high molecular polymers integrated with high thermal conductivity oxide particles such as graphite, alumina, and magnesium oxide.

In one embodiment, the thermal conductivity K of the thermal-conductive plastic cover is in a range of 0.1~6 W/(m·K).

In one embodiment, the material and formula design of the thermal-conductive plastic cover 101 will not affect the magnetic induction and will not affect the wireless charging function.

In one embodiment, as shown in FIG. 1A and FIG. 1B, the metallic case 104 comprises a metallic plate, wherein the first recess 104R is formed at the upper side of the metallic plate of the metallic case 104, wherein a second recess 104RB is formed at the lower side of the metallic plate of the metallic case 104, wherein a second circuit board 105 is disposed in the second recess 104RB of the metallic case 104.

In one embodiment, as shown in FIG. 1C, an air deflector 101c is disposed at a bottom surface of the thermal-conductive plastic cover 101 above the fan 107.

In one embodiment, the second circuit board 105 contains the main electronic components of the wireless charger 100, and the heat-generating components will conduct heat to the air deflector 101c, as shown in FIG. 1C, through the structural design and the thermal pad.

In one embodiment, the second circuit board 105 is EMI shielded by the metallic case 104 by having a portion of the metallic case 104 disposed under the second circuit board 105.

In one embodiment, as shown in FIG. 1A and FIG. 1B, a cover such as a metal cover 106 is disposed under the second circuit board 105.

In one embodiment, fan 107 can be selected through the wind tunnel 130 simulations of each condition. For example, after obtaining the airflow required to keep the mobile phone below 40° C. and knowing the pressure drop, impedance curve and fan performance curve (PQ curve) can be used to find a fan design that meets the overall noise operating point.

FIG. 2 is a chart to show different gap sizes of a wind tunnel 130 relative to the charging efficiency when wireless charging an electronic device according to one embodiment of the invention, wherein the charging efficiency is 68.10 when a gap width of the wind tunnel 130 or a vertical height H of the wind tunnel 130 is 1 mm; the charging efficiency is 68.33 when a gap width of the wind tunnel 130 or a vertical height H of the wind tunnel 130 is 2 mm, and the charging efficiency is 66.65 when a gap width of the wind tunnel 130 or a vertical height H of the wind tunnel 130 is 3 mm, as shown in FIG. 1E.

As shown in FIG. 2, the total loss is 12.76 when a gap width of the wind tunnel is 130 or a vertical height H of the wind tunnel is 1 mm; the total loss is 12.67 when a gap width of the wind tunnel is 130 or a vertical height H of the wind tunnel 130 is 2 mm, and the total loss is 13.34 when a gap width of the wind tunnel 130 or a vertical height H of the wind tunnel 130 is 3 mm, as shown in FIG. 1E.

FIG. 3 is a chart to compare temperatures of different components when wireless charging an electronic device using the present invention or conventional method, wherein the temperature of the electronic device being wirelessly charged is 38.95° C. using the present invention, and the temperature of the electronic device being wirelessly charged 69.74° C. using the conventional method. The temperature of the thermal-conductive plastic cover is 38.11° C. using the present invention, and the temperature of the cover is 67.26° C. using the conventional method. As a result, the present invention can keep the temperature of the electronic device being wirelessly charged not greater than 40° C. to maintain high-wattage charging for a longer period.

As shown in FIG. 3, the temperatures of other components are also lowered using the present invention compared with the temperatures of other components using the conventional method.

From the foregoing, it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated.

What is claimed is:

1. A wireless charger, comprising:
   a thermal-conductive plastic cover, comprising an insulating and heat-conducting material;
   at least one coil;
   a first circuit board; and
   a metallic case, wherein the at least one coil and the first circuit board are disposed in the metallic case, wherein a wind tunnel is formed between the thermal-conductive plastic cover and the first circuit board for dissipating heat generated by an electronic device when the electronic device is disposed on the thermal-conductive plastic cover for wireless charging the electronic device.

2. The wireless charger of claim 1, wherein the wind tunnel is formed between the thermal-conductive plastic cover and the first circuit board for keeping the temperature of the electronic device not greater than 40° C.

3. The wireless charger of claim 1, wherein a vertical height of the wind tunnel is between 1 mm to 3 mm.

4. The wireless charger of claim 1, wherein a first recess is formed in a top surface of the metallic case, wherein the at least one coil is disposed in the first recess.

5. The wireless charger of claim 4, wherein the at least one coil and the first circuit board are disposed in the first recess, wherein the first circuit board is disposed between the thermal-conductive plastic cover and the at least one coil.

6. The wireless charger of claim 4, wherein the at least one coil comprises a plurality of coils disposed in the first recess, wherein the plurality of coils are stacked into a plurality of layers for charging the electronic device.

7. The wireless charger of claim 1, wherein the thermal-conductive plastic cover comprises a plurality of protruding bumps for increasing the total area for dissipating heat.

8. The wireless charger of claim 7, wherein the protruding bump has a shape of a ball.

9. The wireless charger of claim 1, further comprising a fan, wherein the fan is located on a lateral side of the first circuit board under the thermal-conductive plastic cover.

10. The wireless charger of claim 1, wherein the thermal-conductive plastic cover comprises a hole or an opening groove to allow air to flow into the wind tunnel.

11. The wireless charger of claim 1, wherein a magnetic sheet is disposed under the at least one coil, wherein the at least one coil and the magnetic sheet are tightly bonded to the metallic case.

12. The wireless charger of claim 11, wherein the magnetic sheet comprises at least one of the following: MnZn, NiZn, ferrite, and nanocrystalline.

13. The wireless charger of claim 1, wherein each of the at least one coil is made of an enameled wire.

14. The wireless charger of claim 1, wherein the thermal-conductive plastic cover comprises high molecular polymers integrated with at least one of the following high thermal-conductivity oxide particles: graphite, alumina, and magnesium oxide.

15. The wireless charger of claim 1, wherein the thermal conductivity K of the thermal-conductive plastic cover is in a range of 0.1~6 W/(m·K).

16. A wireless charger, comprising:
a thermal-conductive plastic cover, comprising an insulating and heat-conducting material;
a first circuit board; and
a metallic case, wherein the first circuit board and the metallic case forms a top surface, wherein a wind tunnel is formed between the thermal-conductive plastic cover and said top surface for dissipating heat generated by an electronic device when the electronic device is disposed on the thermal-conductive plastic cover for wireless charging the electronic device.

17. The wireless charger of claim 16, wherein a vertical height of the wind tunnel is between 1 mm to 3 mm.

18. The wireless charger of claim 16, wherein the thermal-conductive plastic cover comprises high molecular polymers integrated with at least one of the following high thermal-conductivity oxide particles: graphite, alumina, and magnesium oxide.

19. The wireless charger of claim 16, further comprising a fan, wherein the fan is located on a lateral side of the first circuit board under the thermal-conductive plastic cover.

20. The wireless charger of claim 16, wherein the thermal-conductive plastic cover comprises a hole or an opening groove to allow air to flow into the wind tunnel.

* * * * *